United States Patent
Carrillo et al.

(10) Patent No.: US 7,453,286 B1
(45) Date of Patent: Nov. 18, 2008

(54) COMPARATOR AND METHOD OF IMPLEMENTING A COMPARATOR IN A DEVICE HAVING PROGRAMMABLE LOGIC

(75) Inventors: Jorge Ernesto Carrillo, San Jose, CA (US); Raj Kumar Nagarajan, San Jose, CA (US); James M. Pangburn, San Jose, CA (US); Navaneethan Sundaramoorthy, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 11/788,657

(22) Filed: Apr. 19, 2007

(51) Int. Cl.
*G06F 7/38* (2006.01)
*H03K 19/173* (2006.01)

(52) U.S. Cl. .............................. 326/38; 326/37; 326/40
(58) Field of Classification Search ........................ None
See application file for complete search history.

(56) References Cited

U.S. PATENT DOCUMENTS 6,384,627 B1 * 5/2002 Fross et al. .................... 326/39
7,028,281 B1 * 4/2006 Agrawal et al. ............... 716/12

* cited by examiner

*Primary Examiner*—Anh Q Tran
(74) *Attorney, Agent, or Firm*—John J. King; Robert M. Brush (57) ABSTRACT

A method of implementing a comparator in a device having programmable logic is described. The method comprises implementing a first comparison function in a first lookup table; implementing a second comparison function in a second lookup table; and using an output associated with the first comparison function to select an output of the comparator. A device having programmable logic comprising a comparator is also described.

20 Claims, 5 Drawing Sheets

COMPARATOR AND METHOD OF IMPLEMENTING A COMPARATOR IN A DEVICE HAVING PROGRAMMABLE LOGIC

FIELD OF THE INVENTION

The present invention relates generally to comparators, and in particular, to a comparator implemented in device having programmable logic and a method of implementing a comparator.

BACKGROUND OF THE INVENTION

A programmable logic device (PLD) is designed to be user-programmable so that users may implement logic designs of their choices. One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. In some CPLDs, configuration data is stored on-chip in non-volatile memory, then downloaded to volatile memory as part of an initial configuration sequence.

Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., flash memory, as in some CPLDs), or in any other type of memory cell.

PLDs also have different "modes" depending on the operations being performed on them. A specific protocol allows a programmable logic device to enter into the appropriate mode. Typical PLDs have internal blocks of configuration memory which specify how each of the programmable cells will emulate the user's logic. During a "program" mode, a configuration bitstream is provided to non-volatile memory. An example of a non-volatile memory is a read-only memory (ROM) (e.g. a programmable ROM (PROM), an erasable PROM (EPROM), or an electrically erasable PROM (EEPROM)) either-external or internal to the programmable logic device. Each address is typically accessed by specifying its row and column addresses. During system power up of a "startup" mode, the configuration bits are successively loaded from the non-volatile memory into static random access memory (SRAM) configuration latches of the configuration logic blocks. At the end of this start-up phase, the PLD is now specialized to the user's design, and enters into a "user" mode as part of its normal operation.

However, resources of an integrated circuit having programmable logic must be conserved. That is, because there is only a limited amount of configuration resources, it is important to implement circuits using the configurable resources as efficiently as possible. While equality or inequality comparison functions may be implemented using lookup tables (LUTs) in conventional programmable logic devices, other relational comparison functions, such as "greater than," "greater than or equal to," "less than," or "less than or equal to," are more difficult to implement without using significant configurable logic resources of the programmable logic devices.

Accordingly, there is a need for an improved comparator and method of implementing a comparator in a device having programmable logic.

SUMMARY OF THE INVENTION

A method of implementing a comparator in a device having programmable logic is described. The method comprises implementing a first comparison function in a first lookup table; implementing a second comparison function in a second lookup table; and using an output associated with the first comparison function to select an output of the comparator. Implementing a first comparison function in a first lookup table and implementing a second comparison function in a second lookup table may comprise implementing a first comparison function and implementing a second comparison function in portions of a single lookup table, or implementing a first comparison function in a first lookup table and implementing a second comparison function in a separate second lookup table. Using an output associated with the first comparison function to select an output of the comparator may comprise using an output of the first lookup table as a selection signal for a multiplexer and an output of the second lookup table as an input to the multiplexer.

According to an alternate embodiment, a method of implementing a comparator in a device having programmable logic comprises providing a multistage comparator having a stage receiving the most significant bits of a compared value and one or more stages receiving lower significant bits of the compared value; implementing, for each stage, a first comparison function in a first lookup table; implementing, for each stage, a second comparison function in a second lookup table; and using, for each stage receiving lower significant bits, an output of the first lookup table to select a result for the stage. The method may further comprise using an output of the stage receiving the most significant bits to select a result for the comparator. The method may further comprise coupling lookup tables having shift registers of each stage and loading the lookup tables by shifting the data through lookup tables.

A device having programmable logic comprising a comparator is also described. The device comprises a plurality of comparator stages, each comparator stage comprising a first comparison function and a second comparison function and coupled to receive a portion of a compared value; and a selection circuit coupled to receive the output of a first comparison function at a selection input and an output of a second comparison function at an input. The device may further comprise an output coupled to the stage receiving the most significant bits of the compared value and generating a result of the comparison. Each comparator stage of the device may comprise a lookup table, wherein a first lookup table implements the first comparator function and a second lookup table implements the second comparator function. Each comparator stage of the device may comprise lookup tables implemented as shift registers which are coupled to enable the loading of the lookup tables.

DETAILED DESCRIPTION OF THE DRAWINGS

Figure 1:
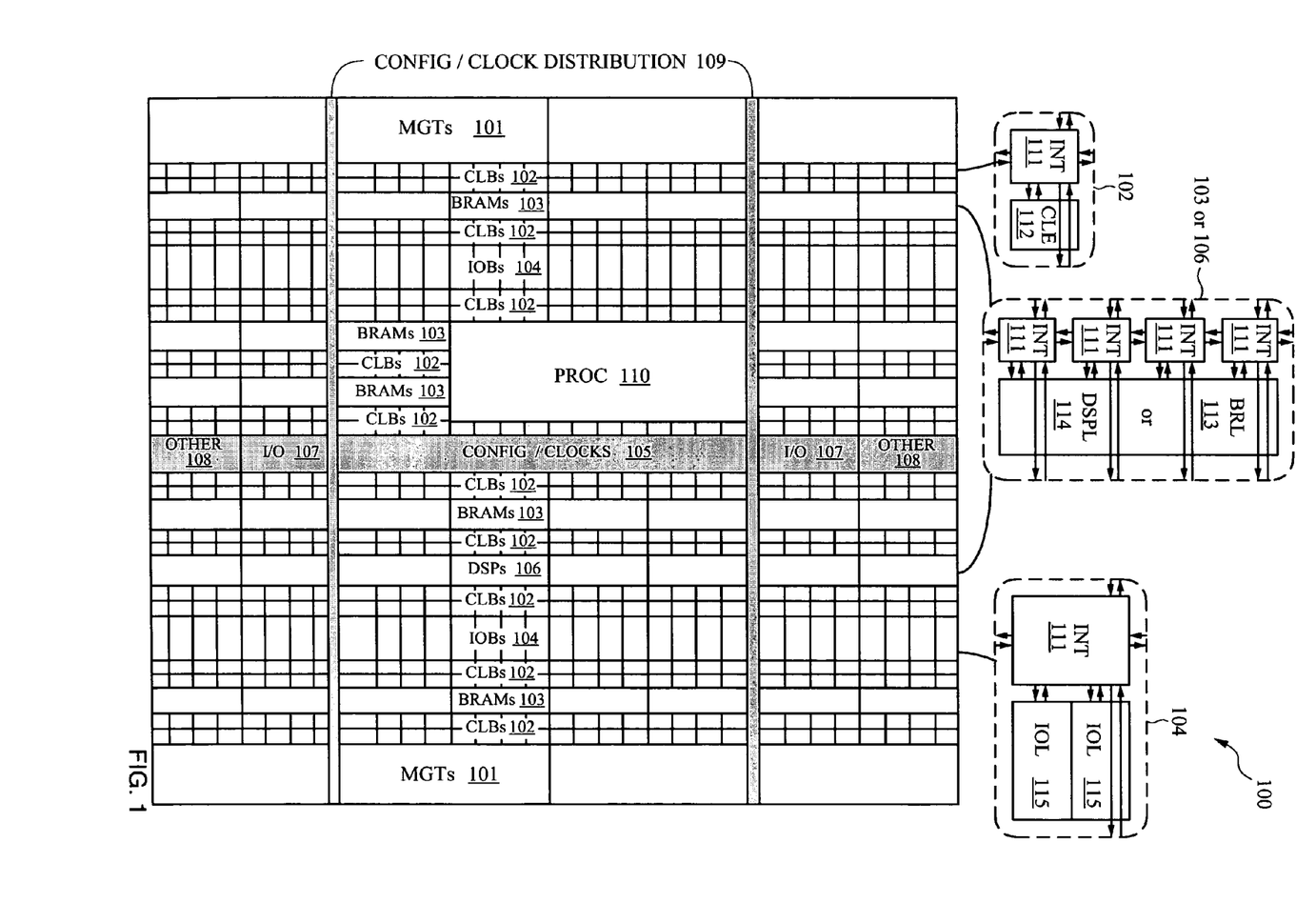
FIG. 1 is a block diagram of a programmable logic device according to an embodiment the present invention.

Turning first to FIG. 1, a block diagram of a programmable logic device according to an embodiment the present invention is shown. The FPGA architecture 100 of FIG. 1 includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 may include a configurable logic element (CLE 112) that may be programmed to implement user logic plus a single programmable interconnect element (INT 111). A BRAM 103 may include a BRAM logic element (BRL 113) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL 114) in addition to an appropriate number of programmable interconnect elements. An IOB 104 may include, for example, two instances of an input/output logic element (IOL 115) in addition to one instance of the programmable interconnect element (INT 111).

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of integrated circuit having programmable logic.

Figure 2:
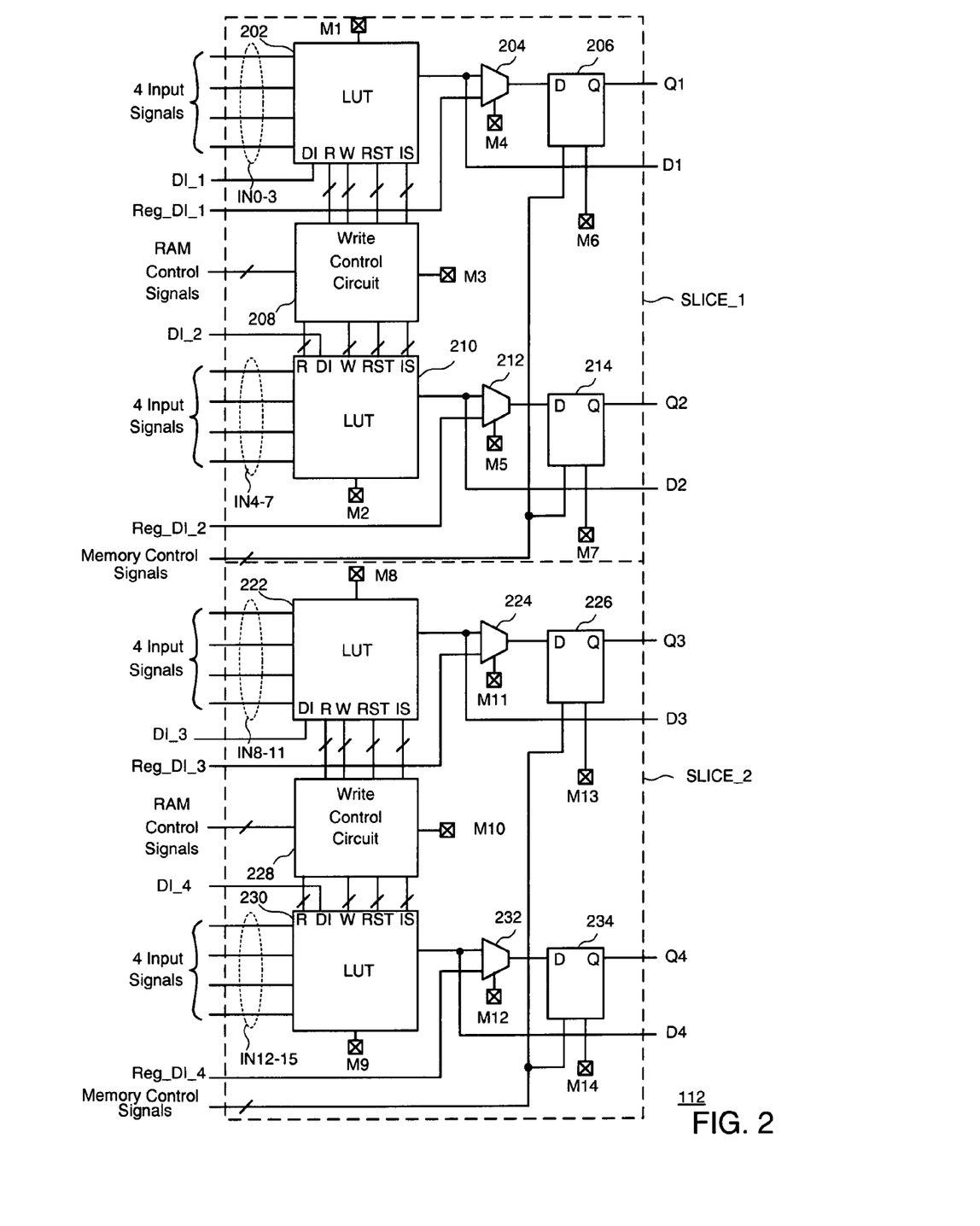
FIG. 2 is a configurable logic element of a programmable logic device according to an embodiment of the present invention.

Turning now to FIG. 2, a configurable logic element of a programmable logic device according to an embodiment of the present invention is shown. In particular, FIG. 2 illustrates in simplified form a configurable logic element of a configuration logic block 102 of FIG. 1. The configurable logic element shown comprises two similar slices, where each slice comprises a pair of function generators. However, the configurable logic element may comprise more slices, such as four slices, for example. Each function generator may function in any of several modes depending upon the configuration data in the configuration memory elements M1-M14. When in RAM mode, input data is supplied by input terminals DI_1 and DI_2 to the data input (DI) terminal of the associated function generator. Each function generator, which may comprise a lookup table, provides an output signal to an associated selection circuit such as a multiplexer, which selects between the output signal of the function generator and an associated register direct input signal Reg_DI_1 or Reg_DI_2 from the programmable interconnect element. Thus, each function generator may be optionally bypassed. When in a look-up table mode, each function generator implemented as a look-up table has four data input signals IN0-IN3. Slice 1 comprises a function generator implemented as a lookup table 202 coupled to a multiplexer 204. In particular, the lookup table 202 receives 4 input signals which are decoded to generate an output DI associated with data stored in the lookup table at the address designated by the input signals. The multiplexer 204 is adapted to receive the output of lookup table 202 and a registered value of Reg_DI_1. The output of the multiplexer 204 is coupled to a register 206 which generates an output Q1.

A Write Control Circuit 208 is coupled to receive RAM control signals and generate signals to control the lookup table 202. In addition to a data input (DI) coupled to receive DI_1 and conventional read and write control signals coupled to a read enable input (R) and a write enable input (W), respectively, the lookup table 202 comprises a partial reset input (RST) for receiving a partial reset signal, and an initial state input (IS) for receiving an initial state signal. Such resetting of the memory elements enables resetting the lookup table memory cells during a partial reconfiguration of a programmable logic device, including partial reconfiguration of a device during operation. One advantage of resetting lookup table memory elements of a device during partial reconfiguration is that it is not necessary to cycle through the required clock cycles to set the correct data after the partial reconfiguration. Similarly, slice 1 comprises a function generator implemented as a lookup table 210 coupled to a multiplexer 212. The lookup table 210 is adapted to receive input signals IN4-IN7, while the multiplexer 212 is coupled to receive the output D2 of the lookup table 210 and the registered input value Reg_DI_2. The output of the multiplexer 212 is coupled to a register 214 which generates an output Q2. The write control circuit 208 also generates a partial reset signal and an initial state signal for selectively resetting or setting one or more of the bits of the lookup table 210.

Similarly, slice 2 comprises a function generator implemented as a lookup table 222 coupled to a multiplexer 224. The lookup table 222 is adapted to receive input signals IN8-IN11, while the multiplexer 224 is coupled to receive the output of the lookup table 222 and a registered input value Reg_DI_3. The output of the multiplexer 224 is coupled to a register 226 which generates an output Q3. A Write Control Circuit 228 is coupled to receive RAM control signals and generate signals to control the lookup table 222. In particular, input signals IN8-IN11 are decoded to generate an output D3 associated with data stored in the lookup table at the address designated by the input signals. The lookup table 222 comprises a partial reset input (RST) for receiving a partial reset signal, and an initial state input (IS) for receiving an initial state signal. Similarly, slice 2 comprises a function generator implemented as a lookup table 230 coupled to a multiplexer 232. The lookup table 230 is adapted to receive input signals IN12-IN15, while the multiplexer 232 is coupled to receive the output D4 of the lookup table 230 and a registered input value Reg_DI_4. The output of the multiplexer 232 is coupled to a register 234 which generates an output Q4. The write control circuit 228 also generates a partial reset signal and an initial state signal for selectively resetting or setting one or more of the bits of the lookup table 230.

Figure 3:
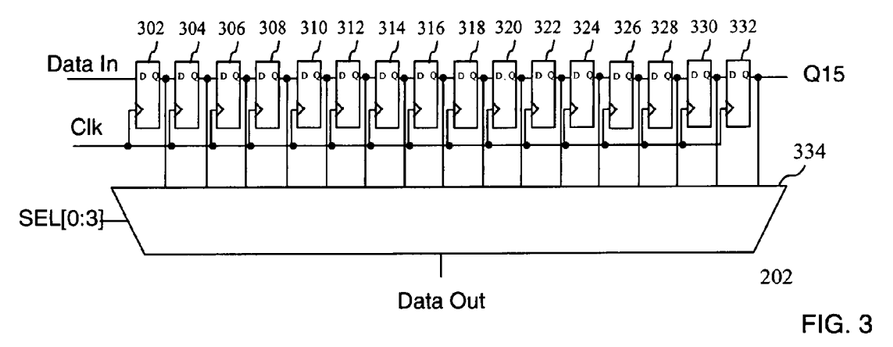
FIG. 3 is a block diagram of a lookup table of a configurable logic element according to an embodiment of the present invention.

Turning now to FIG. 3, a block diagram of an implementation of a lookup table of a configurable logic element according to an embodiment of the present invention is shown. The lookup table of FIG. 3 comprises a shift register having sixteen registers 302-332 coupled to serially receive the input data Data In (DI). The output of each of the registers is coupled to a multiplexer 334. The output Data Out of the multiplexer is selected based upon a 4 bit input signal SEL [0:3]. The input select signal SEL[0:3] provides the address for the data which is output. As will be described in more detail to FIG. 4, a shift-register function of the lookup tables is used for loading the lookup table contents. Accordingly, the lookup tables may be chained together to enable loading of multiple look up tables. The lookup table function is then used for a real-time comparison function for input data.

Figure 4:
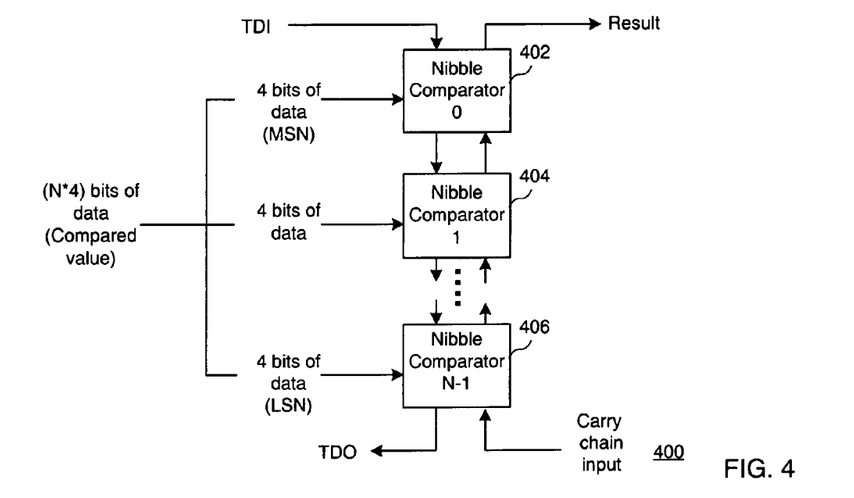
FIG. 4 is a block diagram of a comparator according to an embodiment of the present invention.

Turning now to FIG. 4, a block diagram of a comparator according to an embodiment of the present invention is shown. The comparator 400 contains N nibble comparators 302-306 connected in a chain. Each stage, or nibble comparator, of the comparator has two connections to each adjacent nibble comparator, including one input and one output. Each stage gets a slice or "nibble" of the data to be compared. By way of example, 4 bits are provided to each nibble comparator in the embodiment of FIG. 4. The Most Significant Nibble (MSN) comprising the most significant bits (MSBs) of the compared value comprises an address value coupled to nibble comparator 0 and the Least Significant Nibble (LSN) comprising the least significant bits (LSBs) comprises an address value coupled to nibble comparator N-1. A TDI serial input is coupled to nibble comparator 0, while a TDO serial output is generated by the nibble comparator N-1. The purpose of the TDI input is to shift in the comparison operations to be stored in the nibble comparators, as will be described in more detail below. That is, the data stored in the nibble comparators are based upon the comparison operation against which the compared value will be matched. The carry chain input to the nibble comparator N-1 is a value which may be programmed as "0" or "1," and may be propagated through the carry chain all the way to the result signal, where the propagation depends on the comparison result of each nibble comparator. The result of the comparison will be generated as the result signal. For example, a match between the comparison value and the compared value will be flagged with a "1," while a miss will be flagged with a "0". Although 4-bit inputs to the nibble comparators are shown by way of example in FIGS. 4-6, inputs having a different number of input bits could be employed according to other embodiments of the invention, as would be apparent to one skilled in the art. That is, for some embodiments a nibble may correspond to 4 bits, and in other embodiments, a nibble may correspond to an arbitrary number of bits. As used herein, a nibble means a group of any number of bits, and a nibble comparator is a stage comparator. While the examples of nibble comparators shown and described herein may be identical, in other embodiments different stages may have different numbers of bits.

Figure 5:
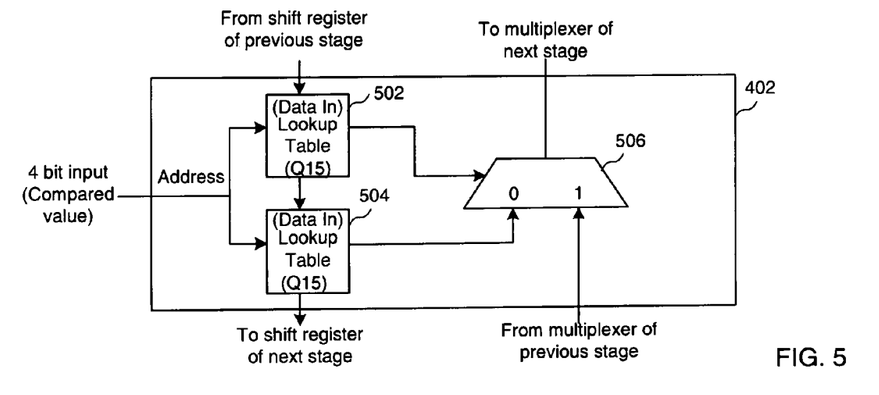
FIG. 5 is a comparator stage according to an embodiment of the present invention.

Turning now to FIG. 5, a comparator stage according to an embodiment of the present invention is shown. In particular, each of the N-1 nibble comparators has two lookup tables 502 and 504 comprising dynamic shift registers. When implemented in a programmable logic device, the lookup tables may be implemented according to the 16-bit shift register of FIG. 3 described above, where two lookup tables may be implemented in a slice of FIG. 2. The outputs of each of the lookup tables are coupled to a carry multiplexer 506. The input to the nibble comparator is a 4-bit signal, which is the value to be compared, and is input to both lookup tables 502 and 504. The output of the lookup table 502 is connected to the selection input of the multiplexer 506. The output of the lookup table 504 is connected to the "0" input of the multiplexer. The lookup tables are coupled together by a serial output and input for loading the data, and in the carry chain from the output of a previous multiplexer.

A lookup table comprising a shift register, such as the lookup table of FIG. 3, is a memory. A 4-input lookup table is a 16-bit memory with a 4-bit input receiving an address and a 1-bit output. The output is the value of the memory bit selected by the address input to the memory. A 4-bit equality comparator must assert its output (i.e. generate a valid logical "1") only when its input matches a chosen value. For example, if it desired that the assert a valid logical "1" at its output when an input value is equal to 2, memory M[2] of the lookup table should be a logical "1" while the other memory bits should be a logical "0." Table 1 illustrates how to use a 4-input lookup table for equality of a 4-bit number. That is, for a desired comparison value V, the lookup table needs to be loaded with "1<<V." As shown for example in Table 1 showing an equality comparison function, when creating a comparison value of 2, the required memory contents are shown in the shaded block. Accordingly, if the compared value is the address value corresponding to 2, a logical "1" indicating a match will be generated at the output.

TABLE 1

| Comparison Value | Required LUT Memory Contents (M[15] ... M[0]) |
|---|---|
| 0000 | 0000000000000001 |
| 0001 | 0000000000000010 |
| 0010 | 0000000000000100 |
| 0011 | 0000000000001000 |
| 0100 | 0000000000010000 |
| 0101 | 0000000000100000 |
| 0110 | 0000000001000000 |
| 0111 | 0000000010000000 |
| 1000 | 0000000100000000 |
| 1001 | 0000001000000000 |
| 1010 | 0000010000000000 |
| 1011 | 0000100000000000 |
| 1100 | 0001000000000000 |
| 1101 | 0010000000000000 |
| 1110 | 0100000000000000 |
| 1111 | 1000000000000000 |

Table 2 shows the memory contents for a "less than" (<) comparison. That is, for each i from 0 to V−1: M[i]=1, and for each i in V to 15: M[i]=0.

TABLE 2

| Comparison Value | Required LUT Memory Contents (M[15] ... M[0]) |
|---|---|
| 0000 | 0000000000000000 |
| 0001 | 0000000000000001 |
| 0010 | 0000000000000011 |
| 0011 | 0000000000000111 |
| 0100 | 0000000000001111 |
| 0101 | 0000000000011111 |
| 0110 | 0000000000111111 |
| 0111 | 0000000001111111 |
| 1000 | 0000000011111111 |
| 1001 | 0000000111111111 |
| 1010 | 0000001111111111 |
| 1011 | 0000011111111111 |
| 1100 | 0000111111111111 |
| 1101 | 0001111111111111 |
| 1110 | 0011111111111111 |
| 1111 | 0111111111111111 |

Table 3 summarizes different algorithms supported by the comparators.

TABLE 3

| Comparison | Formula |
|---|---|
| == | For each i in 0 to V: M[i] = 0, M[V] = 1 |
|  | For each i in V + 1 to 15: M[i] = 0 |
| < | For each i in 0 to V − 1: M[i] = 1 |
|  | For each i in V to 15: M[i] = 0 |
| > | For each i in 0 to V: M[i] = 0 |
|  | For each i in V + 1 to 15: M[i] = 1 |
| != | For each i in 0 to V: M[i] = 1, M[V] = 0 |
|  | For each i in V + 1 to 15: M[i] = 1 |
| <= | For each i in 0 to V: M[i] = 1, |
|  | For each i in V + 1 to 15: M[i] = 0 |
| >= | For each i in 0 to V − 1: M[i] = 0 |
|  | For each i in V to 15: M[i] = 1 |
| Zero | For each i in 0 to 15: M[i] = 0 |
| X (don't care) | For each i in 0 to 15: M[i] = 1 |

In order to create comparators larger than 4 bits, each of the nibble comparators is programmed using 32 bits with 16 bits for each lookup table. For example, a 32-bit comparator is a chain of eight nibble comparators. Therefore, each 32-bit comparator must be programmed with 256 bits. In order to create comparison functions other than an equality comparison, two comparison functions are employed, as will be described in the various examples below. Further, depending upon the size of the lookup tables, the two comparison functions may be implemented in one or two lookup tables.

For example, in order to create an "equals" comparator, the lookup tables for the N nibble comparators are provided with the following functionality:
1. For each nibble comparator in 0 to N−1:
   a. Program lookup table 502 with an equal operation
   b. Program lookup table 504 with a Zero operation, and
2. Set the carry chain input to "1."

The "equals to" comparator operation starts with the MSN. In any particular nibble comparator, the lookup table 502 will perform an "equals to" operation. If the value is equal to the comparison value stored in the lookup table, then the multiplexer will allow the "1" input of the multiplexer to be propagated out. The next nibble comparator is then evaluated in the chain. If the value is not equal, then the multiplexer propagates the value in its "0" input. Since all lookup tables 504 will always output a logical "0" in an "equal" operation, the value of logical "0" will be the result output of the comparator if any nibble comparators generate a logical "0." The result will only be a logical "1" indicating a match of the compared value and the comparison value when all of the nibble comparators allow the carry chain input to be propagated. For example, if the desired comparison value is equal to the hex value XOXX1234, where an "X" is a "don't care," the lookup table contents for an "equals" comparator are shown in Table 4.

TABLE 4

| Nibble | Lookup Table 502 | Lookup Table 504 |
|---|---|---|
| LSN | 0000000000010000 | 0000000000000000 |
|  | 0000000000001000 | 0000000000000000 |
|  | 0000000000000100 | 0000000000000000 |
|  | 0000000000000010 | 0000000000000000 |
|  | 1111111111111111 | 0000000000000000 |
|  | 1111111111111111 | 0000000000000000 |
|  | 0000000000000001 | 0000000000000000 |
| MSN | 1111111111111111 | 0000000000000000 |

In order to create a "less than" (<) comparator, the lookup tables for the N nibble comparators are provided with the following functionality:
1. For each nibble comparator in 0 to N−2:
   a. Program lookup table 502 with an == operation
   b. Program lookup table 504 with a < operation,
2. For nibble comparator N−1:
   a. Program lookup table 502 with < operation
   b. Program lookup table 504 with a Zero operation, and
3. Set the carry chain input to "1."

When performing a "less than" comparator operation, in any particular nibble comparator except for the nibble comparator N, the lookup table 502 will perform an "equal to" operation. If the value is equal, then the multiplexer allows the "1" input to be propagated. The next nibble comparator in the chain is then evaluated. If the value is not equal, then the multiplexer selects the "0" input, and the result of the lookup table 504, which performs a "less than" operation, is checked. If the compared value is less than the comparison number, then the output is "1" and is propagated all the way to the result signal, indicating a match. If the value is not less than the number, then the output is a logical zero "0" and is propagated all the way to the result signal, indicating a miss. All nibble comparators follow the same behavior, except for the N−1 nibble comparator for the LSN. It should be noted that, only if the equal comparisons match for all the previous nibble comparators, will the last nibble comparator which is a direct "less than" comparison be evaluated. The lookup table 502 performs a "less than" operation. If the value is less than that number, then carry chain input value gets propagated all the way to the result signal, indicating a match. If the value is not less than the number, then the multiplexer selects the "0" input. The output of lookup table 504 is always "0" for the Zero operation, and the logical "0" value gets propagated all the way to the "Result" signal, indicating a miss. For example, if the desired comparison is less than the hex value 12341234, the M contents for a less than operation are indicated in Table 5.

TABLE 5

| Nibble | Lookup Table 502 | Lookup Table 504 |
|---|---|---|
| LSN | 0000000000001111 | 0000000000000000 |
|  | 0000000000010000 | 0000000000000111 |
|  | 0000000000001000 | 0000000000000011 |
|  | 0000000000000100 | 0000000000000001 |
|  | 0000000000010000 | 0000000000001111 |
|  | 0000000000001000 | 0000000000000111 |
|  | 0000000000000100 | 0000000000000011 |
| MSN | 0000000000000010 | 0000000000000001 |

While Table 5 describes a "less than" function implemented in the lookup tables by way of example, any of the other comparison functions shown in the table of FIG. 3 could be similarly implemented in the lookup tables. While two separate lookup tables are shown in FIG. 5, the lookup tables implementing the two comparison functions may be implemented in two portions of a single, larger lookup table, as will be described in more detail in FIG. 6.

Figure 6:
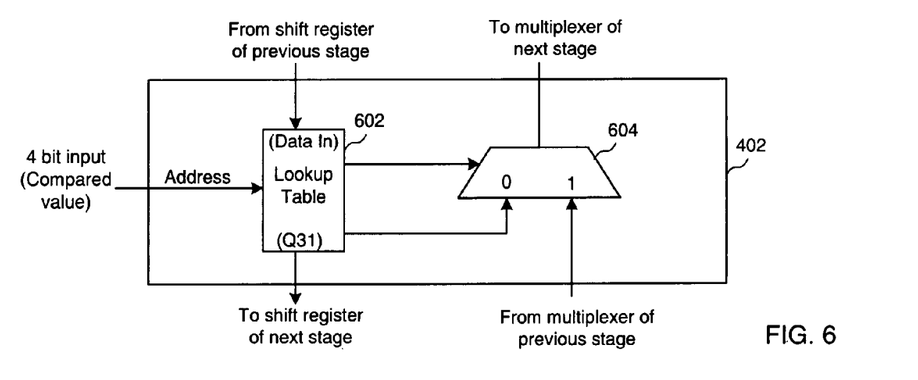
FIG. 6 is a comparator stage according to an alternate embodiment of the present invention.

Turning now to FIG. 6, a comparator stage according to an alternate embodiment of the present invention is shown. According to the embodiment of FIG. 6, a single lookup table 602 is employed and generates both the selection signal to the selection input and the output to the "0" input of the multiplexer 604. That is, if the lookup table is large enough to store both the first and second comparison functions, a single lookup table may be used. For example, for a lookup table storing 32 bits of data, a first function may be stored in a first lookup table comprising a first portion of the single lookup table (e.g. memory locations 0-15) and a second function may be stored in a second lookup table comprising a second portion of the single lookup table (e.g. memory locations 16-31). The 4 LSBs of the 5-bit input address will be coupled to select the first output from one of the memory locations 0-15, and the 4 LSBs with a leading "1" will be used to select the second output from the memory locations 16-31.

Figure 7:
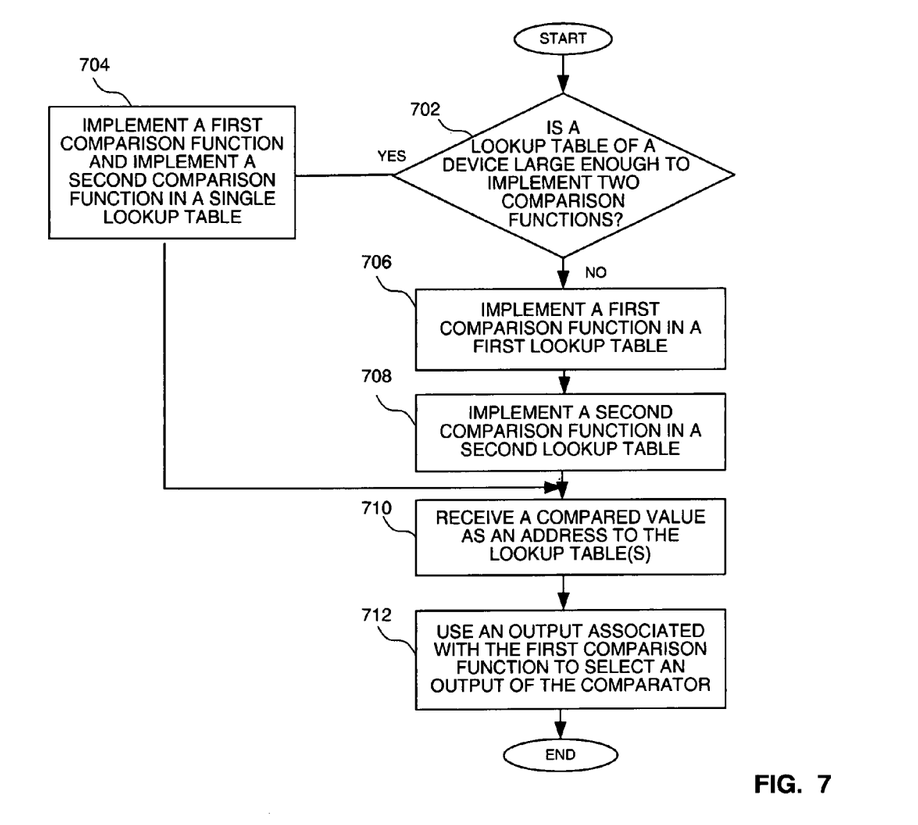
FIG. 7 is a flow chart showing a method of implementing a comparator according to an embodiment of the present invention.

Turning now to FIG. 7, a flow chart shows a method of implementing a comparator according to an embodiment of the present invention. In particular, it is first determined whether a lookup table of a device large enough to implement two comparison functions at a step 702. If so, a first comparison function and a second comparison function are implemented in portions of a single lookup table at a step 704. That is, the first comparison function is implemented in a first lookup table in a first portion of the single lookup table and the second comparison function is implemented in a second lookup table in a second portion of the single lookup table. Otherwise, a first comparison function is implemented in a first lookup table at a step 706, and a second comparison function is implemented in a separate second lookup table at a step 708. A compared value is received as an address at the lookup table(s) at a step 710. An output associated with the first comparison function is used to select an output of the comparator at a step 712. The steps of the method of FIG. 7 may be implemented in a single stage comparator, or each stage of a multi-stage comparator.

Figure 8:
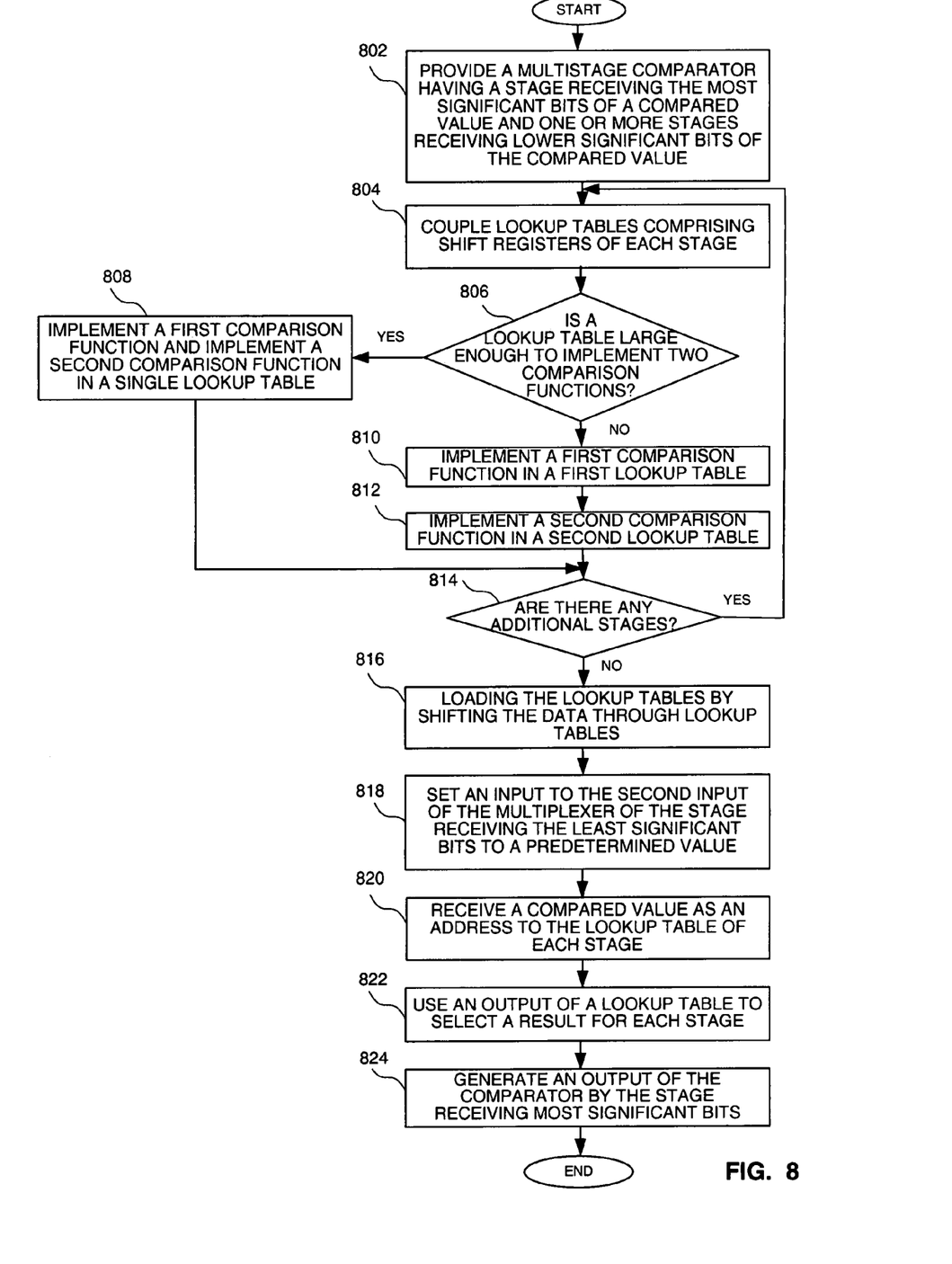
FIG. 8 is a flow chart showing a method of implementing a comparator according to an alternate embodiment the present invention.

Turning now to FIG. 8, a flow chart shows a method of implementing a comparator according to an alternate embodiment the present invention. A multistage comparator having a stage receiving the most significant bits of a compared value and one or more stages receiving lower or less significant bits of the compared value is provided, where each stage coupled to receive a portion of a compared value at a step 802. Note that as used herein, "less significant bits" or "lower significant bits" mean bits representing lower numeric place value. Lookup tables comprising shift registers in each stage are coupled at a step 804. It is then determined whether a lookup table large is enough to implement two comparison functions at a step 806. If so, a first comparison function and a second comparison function are implemented in a first portion and a second portion of a single lookup table at a step 808. Otherwise, the comparison functions are implemented in separate lookup tables, where a first comparison function is implemented in a first lookup table at a step 810, and a second comparison function is implemented in a second lookup table at a step 812. It is then determined whether there are any additional stages at a step 814. If not, the lookup tables are loaded by shifting data comprising the comparison functions through the lookup tables at a step 816. It should be noted that, because the lookup table may comprise shift registers, the lookup tables may be reprogrammed at run-time by shifting in new values. An input of the multiplexer of the stage receiving the least significant bits is set to a predetermined value at a step 818. A compared value is received as an address at the lookup tables at a step 820. An output of a lookup table, for each stage, is used to select a result for the stage at a step 822. Finally, an output of the comparator is generated by the stage receiving the most significant bits at a step 824. The methods of FIGS. 7-8 are preferably optimized to take advantage of the shift registers and carry chain in an FPGA, and utilize a minimal amount of CLBs. The result of a comparator may be chained together with the results of other similar comparators to implement range type of operations, such as "greater than value X AND less than value Y" with any Boolean operand (e.g. AND, OR, XOR, NOT). The circuits and methods are therefore also suitable for implementing on-chip debugging and tracing capabilities. The methods of FIGS. 7 and 8 may be implemented using any of the circuits of FIGS. 1-6 as described, or any other suitable circuits.

It can therefore be appreciated that a comparator and method of implementing a comparator in a device having programmable logic has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A method of implementing a comparator in a device having programmable logic, the method comprising:
   implementing a first comparison function in a first lookup table;
   implementing a second comparison function in a second lookup table, the second comparison function different than the first comparison function; and using an output associated with the first comparison function to select an output of the comparator.

2. The method of claim 1 wherein implementing the first comparison function in the first lookup table and implementing the second comparison function in the second lookup table comprises implementing the first comparison function and implementing the second comparison function in portions of a single lookup table.

3. The method of claim 2 wherein using the output associated with the first comparison function to select the output of the comparator comprises using a first output of the single lookup table as a selection signal for a multiplexer and a second output of the single lookup table as an input to the multiplexer.

4. The method of claim 1 wherein implementing the first comparison function in the first lookup table and implementing the second comparison function in the second lookup table comprise implementing the first comparison function and implementing the second comparison function in separate lookup tables.

5. The method of claim 4 wherein using the output associated with the first comparison function to select the output of the comparator comprises using an output of the first lookup table as a selection signal for a multiplexer and an output of the second lookup table as an input to the multiplexer.

6. The method of claim 1 further comprising storing data associated with a comparison value and the first comparison function in the first lookup table.

7. The method of claim 6 further comprising receiving a compared value as an address to the first lookup table.

8. A method of implementing a comparator in a device having programmable logic, the method comprising:
providing a multistage comparator having a stage receiving most significant bits of a compared value and one or more stages receiving lower significant bits of the compared value;
implementing, for each stage, a first comparison function in a first lookup table;
implementing, for each stage, a second comparison function in a second lookup table, the second comparison function different than the first comparison function; and
using, for each stage receiving lower significant bits, an output of the first lookup table to select a result for the stage.

9. The method of claim 8 further comprising using an output of the stage receiving the most significant bits to select a result for the comparator.

10. The method of claim 8 wherein using, for each stage receiving lower significant bits, the output of the first lookup table to select the result for the stage comprises using an output of the first comparison function.

11. The method of claim 10 wherein using, for each stage receiving lower significant bits, the output of the first lookup table to select the result for the stage comprises selecting an input to a multiplexer.

12. The method of claim 11 further comprising coupling, for each stage after the stage receiving least significant bits, the output of the second comparison function to a first input of the multiplexer and an output of a multiplexer of another stage to a second input of the multiplexer.

13. The method of claim 8 wherein providing a multistage comparator comprises coupling lookup tables comprising shift registers of each stage and loading the lookup tables by shifting the data through the lookup tables.

14. The method of claim 13 further comprising reprogramming the shift registers at run-time by shifting in new values to the shift registers.

15. A device having programmable logic comprising a comparator, the device comprising:
a plurality of comparator stages, each comparator stage comprising:
a first comparison function and a second comparison function each coupled to receive a portion of a compared value, the second comparison function different than the first comparison function; and
a selection circuit coupled to receive the output of the first comparison function at a selection input and an output of the second comparison function at an input; and
an output coupled to the stage receiving most significant bits of the compared value and generating a result of the comparison.

16. The device of claim 15 wherein each comparator stage of the plurality of comparator stages comprises a lookup table.

17. The device of claim 15 wherein each comparator stage of the plurality of comparator stages comprises a first lookup table implementing the first comparison function and a second lookup table implementing the second comparison function.

18. The device of claim 15 wherein each comparator stage comprises lookup tables comprising shift registers which are coupled to enable the loading of the lookup tables.

19. The device of claim 15 wherein the comparator stage receiving the least significant bits of the compared value receives a predetermined value at an input.

20. The device of claim 15 wherein the comparator stage receiving the most significant bits of the compared value generates a result for the comparator.

* * * * *